United States Patent Office 2,828,209
Patented Mar. 25, 1958

2,828,209

PROCESS OF PREPARING A QUICK COOKING RICE

Frank Hollis, Jr., Weehawken, Frank G. Miller, Denville, and Frederick J. Miller, Jersey City, N. J., assignors to General Foods Corporation, White Plains, N. Y., a corporation of Delaware No Drawing. Application August 24, 1954
Serial No. 451,944

5 Claims. (Cl. 99—80)

This invention relates to improvements in quick cooking dry rice.

Raw rice is sometimes marketed without removal of its bran coat as brown rice, but more often the bran coat is removed by milling to form the usual white or milled rice of commerce. In both cases the rice grains are hard, dense and opaque, having a moisture content of about 6–18%. During cooking of such rice, the starch is gelatinized, and the moisture content of the grains increases to about 65–80%, the grains swelling to several times their original size and becoming soft and palatable. In order to make sure that the starch in the centers of the grains is properly cooked, however, relatively long cooking is required with the result that the starch at the grain surfaces becomes overcooked and the starch granules burst, discharging a sticky pasty liquid. The surfaces of the grains are then pasty and unpalatable unless the starch paste is washed off with a resulting loss of nutritive constituents which may amount to as much as 25% by weight of the rice. In order to avoid this undesirable surface overcooking, the cooking period must be shortened so much that the centers of the grains are somewhat undercooked and tough and chewy. Even in this case, moreover, undesirably long cooking times are required.

Processes for treating raw rice to render it quick-cooking are well known. One such process is set forth in U. S. Pat. No. 2,438,939 to Durrani, wherein the rice grains are cooked in water to increase the moisture content thereof to about 65–80% and to swell the grains substantially beyond their original size and are thereafter dried in such a manner as to set them in their enlarged condition. This product has several well known advantages over raw or parboiled rice, and may be prepared for the table in as little as 10 minutes to provide a cooked rice equal in quality to regularly cooked raw rice.

The prior patents of Campbell and Hollis, Nos. 2,696,156 and 2,696,157, and of Shuman and Staley, No. 2,696,158, all granted December 7, 1954, describe other processes for preparing quick cooking rice. In these applications the raw rice of 6–18% water is heated by convection, radiant, or dielectric means, respectively, to produce cracks and fissures throughout the grains. The fissures are believed to facilitate a subsequent cooking operation by allowing rapid penetration of moisture to the interior of the grains. Furthermore, these patents describe a process consisting of a combination of the heat treatment process and the process of the aforementioned Durrani patent, gelatinization of the fissured rice being achieved by either a steam-cooking or a water-cooking step. The rice is subsequently dried in its expanded state, as set forth in the Durrani patent mentioned above.

A process of fissuring the rice grains followed by either steam-cooking or water-cooking has several advantages over the aforesaid Durrani patent. The soaking time prior to gelatinization is decreased and may even be eliminated and the time required for pregelatinization is decreased with a consequent increase in yield over the Durrani process. The dry volume of the finished rice is increased. Most important, however, the product obtained by the gelatinization of fissured rice in this manner requires less time to be prepared for serving, rehydration in some cases being as little as 2 minutes, and the product as served at the table has a soft, non-pasty texture.

The combination of a fissuring treatment and gelatinization by either steam or water cooking, while representing a distinct advance in the art of preparing quick cooking rice, still possesses some disadvantages. In the case where the gelatinization is carried out by water cooking, the losses in yield resulting from surface overcooking of the grain remain higher than desired, particularly if a rice of acceptable texture is to result. These losses may, of course, be reduced by shortening the cooking time, but the resulting rice will have an undercooked center portion and will be generally non-uniformly gelatinized. Where steam-cooking is employed, insufficient moisture may be provided to give the required degree of swelling in which case the product as served at the table is of a somewhat rubbery texture. This problem can be partially solved by soaking the fissured rice in water prior to steaming, but this procedure has been found to result in a high degree of breakage of the rice grains in the steaming step.

It is an object of this invention to provide a process for preparing a quick-cooking rice of good texture and rapid rehydration qualities without the aforementioned losses of yield and grain breakage which occur with the processes of the prior art.

It has now been found that by subjecting raw rice to a heating or other procedure to produce fissures therein, gelatinizing the fissured grains by a combination of water-cooking followed by steam-cooking, and thereafter drying the grains so as to set them in their expanded state, a quick-cooking rice of greatly improved texture and appearance is obtained. Furthermore, the use of this procedure provides all the aforesaid benefits of the combination of fissuring with gelatinization but without the aforementioned disadvantages relating to loss of yield and insufficient swelling of the grains.

As mentioned hereinabove, a heat treatment step produces numerous small cracks or fissures extending inwardly from the surfaces of the grain. By subjecting these grains to partial cooking in water, sufficient moisture is provided for the gelatinization process, and at the same time, the surface of the grains are provided with a layer of gelatinized starch which retains the grains integral during subsequent steam-cooking. Also, by discontinuing water-cooking at a point short of surface overcooking, the usual losses due to excessive swelling and bursting of the starch granules on the surface of the grain are prevented. The subsequent steaming step supplies the amount of heat required to complete the gelatinization of the starch throughout the grain while controlling the amount of water available to said starch to permit complete hydration and prevent the aforementioned excessive swelling of the grains and the bursting of the starch granules.

As a more detailed description of the first step in the process of this invention, raw rice may be fissured by any of a number of suitable means. It is preferred to employ a heat treatment similar to those outlined in the above-mentioned patents, but other methods such as mechanical shock and the subjection of raw grains to extremely cold temperatures may be employed if desired providing the grains remain integral and contain cracks and fissures after the treatment.

It is further preferred that the convection heating procedure such as outlined in the aforementioned U. S. Patent No. 2,696,156 be employed. Here the grains may simply be heated in any suitable convection oven, or a hot dry atmosphere of air, steam or other gas may be passed through or over the grains by forced circulation. The extent of heating can be controlled according to the final surface temperature of the rice grains. Insufficient heating, as manifested by too low a final grain surface temperature, will not produce sufficient cracking or fissuring to effect the desired improvement in the cooking properties of the rice. Excessive heating, as manifested by too high a final grain surface temperature, results in undue breakage of the grains and scorching.

Hence, the period of heating should be correlated with the heating conditions to produce the proper final surface temperature of the rice. It has been found that the temperature limits to be observed vary according to the moisture content of the raw rice. At a normal moisture content of around 11%, the final temperature of the rice should be between 140° F. and 225° F. At a moisture level of 18%, which is about the maximum for the present process, the final rice temperature should be between 110° F. and 200° F. Drier rice can also be treated. At 6% moisture, which is about the minimum for the present process, the final rice temperature should be between 180° F. and 260° F. As a rule, commercial rice has a moisture content in the range of 10–14%, and is well suited for treatment by the present process. Of course, such rice may be further dried before treatment, but no practical advantage is gained thereby.

The temperature of the heating atmosphere must be at least that which is to be produced in the rice grains, and in general should not exceed about 285° F. because of the danger of scorching the grains. While the rate of heating to the desired final temperature is not too critical, extremely slow rates have been found undesirable. In general, periods of 10–30 minutes are desirable to insure uniform and thorough heating and cracking of all grains. In order to expedite the heat treatment, the temperature of the heating atmosphere may be higher than that to which the rice is to be raised, and the heating time may be correspondingly shorter.

Generally, the rice grains are heated in a suitable convection oven, preferably with forced circulation of the hot dry atmosphere through the rice to insure uniform heating of the individual grains and to expedite the heating operation. The heating atmosphere will usually comprise hot, substantially dry air, but any other desired inert gas can be employed instead. Steam may also be used under conditions such that condensation on the rice grains, if any, does not unduly increase the moisture content of the grains.

Following the heat treatment step, the rice is partially gelatinized by immersing the grains in water at a temperature above that required to gelatinize the rice. Cooking is continued until the moisture content of the rice has increased to at least about 50% with accompanying partial gelatinization. As a practical matter, temperatures from 190° F. to 212° F. are employed for times ranging from six to eighteen minutes. Temperatures below 190° F. may, of course, be employed, but in general the gelatinization at such temperatures proceeds at too low a rate, and insufficient cooking results. While temperatures above 212° F. may be employed, greater losses of nutrient material occur, with the result that some of the benefits of this invention are not realized.

Cooking of the rice by immersion in water, if extended for a longer period, would result in a completely gelatinized product, and would in effect duplicate the process of the above-mentioned Durrani patent in combination with a pre-heat treatment as disclosed in one of the aforesaid prior patents. In the present invention, however, gelatinization proceeds by water-cooking at the temperatures indicated only until the rice has a moisture content within the range of about 50–70%. At this point the rice is removed from the water and the gelatinization and hydration are completed by application of steam to the rice.

The cause generally attributed to the loss of nutrient material during water-cooking is, as aforementioned, excessive swelling and bursting of the starch granules on the surface of the rice which occurs during the latter stages of cooking. By removing the grains from the presence of excess water in these latter stages of cooking, and allowing the gelatinization to continue in the presence of a limited amount of water and heat supplied by the steam, the excessive swelling and bursting of the starch granules is prevented and at the same time uniform gelatinization of the starch throughout the rice grains is achieved.

In carrying out the steam-cooking step, the partially gelatinized rice is subjected to steam, preferably at atmospheric pressure, for a time sufficient to provide completion of gelatinization. This time requirement will, of course, depend on the amount of gelatinization achieved in the water-cooking step and, in general, will range from 8 to 16 minutes at atmospheric pressure. Where a short water-cooking time is employed, e. g., to provide only 50% moisture in the rice, a greater period of steaming will be required to complete gelatinization and increase the moisture content of the rice to 65–80%. On the other hand, where water-cooking is carried out to a greater extent, e. g., the moisture content of the rice is above 65%, less steaming is required to complete gelatinization and in many cases completion of gelatinization can be accomplished after about 6 minutes steaming and with virtually no increase in the moisture content of the rice.

After steam cooking, the rice is greatly swollen, substantially completely gelatinized and contains from 65–80% moisture. Gelatinization of the starch is uniform throughout the grain and substantially none of the surface portions of the grain has been lost due to surface overcooking.

Following the steaming step it is usually desirable to cool the rice to prevent further gelatinization. This cooling may be brought about either by exposing the precooked rice to a blast of cold air or preferably by immersing it in cold water. The latter method has the additional advantage of washing any foreign material from the cooked rice, and since there is little or no surface overcooking, no appreciable quantity of soluble solids is removed by such washing.

After the precooked rice has been cooled, it is next subjected to rapid drying which, as described in the aforesaid Durrani patent, removes moisture from the surfaces of the grains at a rate sufficiently faster than it can diffuse thereto from their interiors so as to set them in their enlarged condition and produce a porous structure therein. As a result of preliminary cracking or fissuring, however, the rice dries at a much faster rate. Using apparatus similar to that described in the prior patent, the fissured rice can be dried satisfactorily in about two thirds of the time needed for rice which is not fissured. This results from the fact that, as explained above, the rice grains are bulkier and hence have greater surface area from which moisture can be removed, and from the further fact that said fissures provide additional exits to remove the water from the centers of the grains to their surfaces. Moreover, because of the greater bulk of the precooked grains and the more rapid drying thereof, the dried product is bulkier and fluffier than similar products heretofore produced, being 15 to 50% greater in bulk than the bulkiest rice obtained in any of the prior processes.

Best drying results are obtained by spreading the moist rice on a supporting screen and blowing relatively dry heated air upward through the rice, whereby the grains are agitated and separated to prevent matting and to insure thorough air circulation around each grain. With appropriate air velocity and humidity, drying may be carried out at room temperature but it is usually preferable to accelerate drying by heating the air, temperatures greater than about 280° F. being avoided to prevent scorching of the rice. In most cases it is sufficient to dry the rice to about 8 to 14% moisture, but if desired, such rice may be dried to a lower figure.

As a result of its greater size, substantially uniform and complete gelatinization, and greater porosity, the quick-cooking dry rice prepared in the above manner is superior upon rehydration to any such product prepared heretofore. In particular, the rice is quicker cooking, its rehydration requiring as little as 2 minutes in many cases, but the rehydrated or cooked rice also has greater bulk volume, is fluffier and softer and as a result more palatable than similar products heretofore produced; it is also less pasty and substantially devoid of tough, chewy centers; furthermore, upon rehydration or final cooking the product takes up a greater volume of water and its moisture content closely approaches that of the precooked rice prior to drying.

Furthermore, rice having the above-described desirable characteristics is obtained according to the process of this invention without the attendant disadvantages of excessive losses of nutrient material due to surface overcooking or the losses due to excessive breakage of the grains during steaming.

As a specific example of the process of this invention, raw rice of the Blue Bonnet variety having a moisture content of 10-12% is exposed to a substantially dry atmosphere in convection oven at 180° F. for a period of 15 minutes. Following this heat treatment, the rice may be cooled, if desired, or placed directly into the cooking water. At any rate, the rice at this stage contains many small cracks or fissures, as described above, and contains from 4 to 8% moisture.

The fissured rice grains are then immersed in water at 197° F. and cooked for 11 minutes. This serves to partially cook the rice grains and to raise the moisture content thereof to about 60% with concomitant swelling and with little or no loss of nutrient materials.

Following the water-cooking step, the rice is removed from the water and steamed at atmospheric pressure for 10 minutes. At the end of this period, the rice is uniformly and substantially completely gelatinized, and has a moisture content of about 70%.

The rice is then discharged into a whirlpool type washer supplied with cold water entering at 60° F. and is cooled to about 76° F. in about 2 minutes. This washing serves to halt the cooking process at this point and to remove any foreign material present in the rice.

The cool washed rice is placed on a wire screen conveyor for 4 to 5 minutes to drain off excess water, and is then deposited on a continuous conveyor in a layer of about 1 inch thick. The rice is then passed through a forced drier 50 ft. in length and 8 ft. in width. Air is forced upwardly and downwardly through the rice bed at an air inlet temperature of 250° F. and an air velocity of 175 ft. per minute. The rice passes through the drier in 20 minutes and its moisture content is reduced to about 10%.

The quick-cooking rice thus provided has a dry volume of 460 ml./5 ounces of rice and represents a yield of about 93% based on the amount of raw rice processed.

In preparing this product for consumption 5 ounces is simply poured into 360 ml. of tap water which is then brought to a boil and allowed to stand for a period of 2 minutes. At the end of this time all of the rice has been substantially rehydrated and is practically identical to that product which is prepared from raw rice cooked in the ordinary manner. It has a very slightly soft texture and a light, fluffy appearance. In addition the texture is uniform throughout each individual rice grain, the rice being practically devoid of hard centers typical of other quick-cooking rice products.

It will be understood that while the invention has been described in part by means of specific examples reference should be had to the appended claims for a definition of the scope of the invention.

What is claimed is:

1. A process of preparing a quick cooking rice from raw rice grains that are substantially whole and unbroken but which have internal cracks and fissures which comprises subjecting said rice grains to cooking in water at 190°–212° F. to partially gelatinize the grains and to increase the moisture content thereof to about 50–70% with concomitant swelling; subjecting the partially gelatinized grains to steam for a period of time sufficient to substantially complete the gelatinization and to increase the moisture content thereof to from about 65% to about 80%; and then drying the swollen grains by removing the moisture from their surfaces at a rate sufficiently faster than it can diffuse thereto from their interiors to set the grains in their enlarged condition and produce a porous structure therein.

2. A process of preparing a quick cooking rice which comprises subjecting whole rice grains of 6–18% moisture to heat to provide said rice grains with fissures; cooking the fissured rice in the water at 190°–212° F. to partially gelatinize the grains and to increase the moisture content thereof to about 50–70% with concomitant swelling; subjecting the partially gelatinized grains to steam for a period of time sufficient to substantially complete the gelatinization and to increase the moisture content thereof to from about 65% to about 80%; cooling the grains to prevent further gelatinization; and then drying the swollen grains by removing the moisture from their surfaces at a rate sufficiently faster than it can diffuse thereto from their interiors to set the grains in their enlarged condition and produce a porous structure therein.

3. The process according to claim 2 wherein the fissured rice is provided by subjecting raw rice containing 6–18% moisture to a substantially dry hot atmosphere, the time of heating being correlated with the temperature of the atmosphere to raise the surface temperature of the grains to a range of 110° F. to 260° F.

4. A process according to claim 2 wherein the fissured rice is provided by subjecting raw rice containing 6–18% moisture to infrared radiation, the time of exposure being correlated with the intensity of the radiation to raise the surface temperature of the grains to a range of 130° F. to 260° F.

5. A process according to claim 2 wherein the fissured rice is provided by subjecting raw rice containing 6–18% moisture to an alternating electrostatic field, the time of heating being correlated with the intensity of the field to raise the surface temperature of the grains to a range of 110° F. to 280° F.

References Cited in the file of this patent

UNITED STATES PATENTS

| | | |
|---|---|---|
| 2,195,165 | Choppin et al. | Mar. 26, 1940 |
| 2,438,939 | Ozai-Durrani | Apr. 6, 1948 |
| 2,696,156 | Campbell et al. | Dec. 7, 1954 |
| 2,696,157 | Campbell et al. | Dec. 7, 1954 |
| 2,696,158 | Shuman et al. | Dec. 7, 1954 |